Nov. 3, 1936.   W. JONES   2,059,874
COLD STORAGE HUMIDIFICATION AND DEHUMIDIFICATION SYSTEM
Filed Feb. 14, 1935
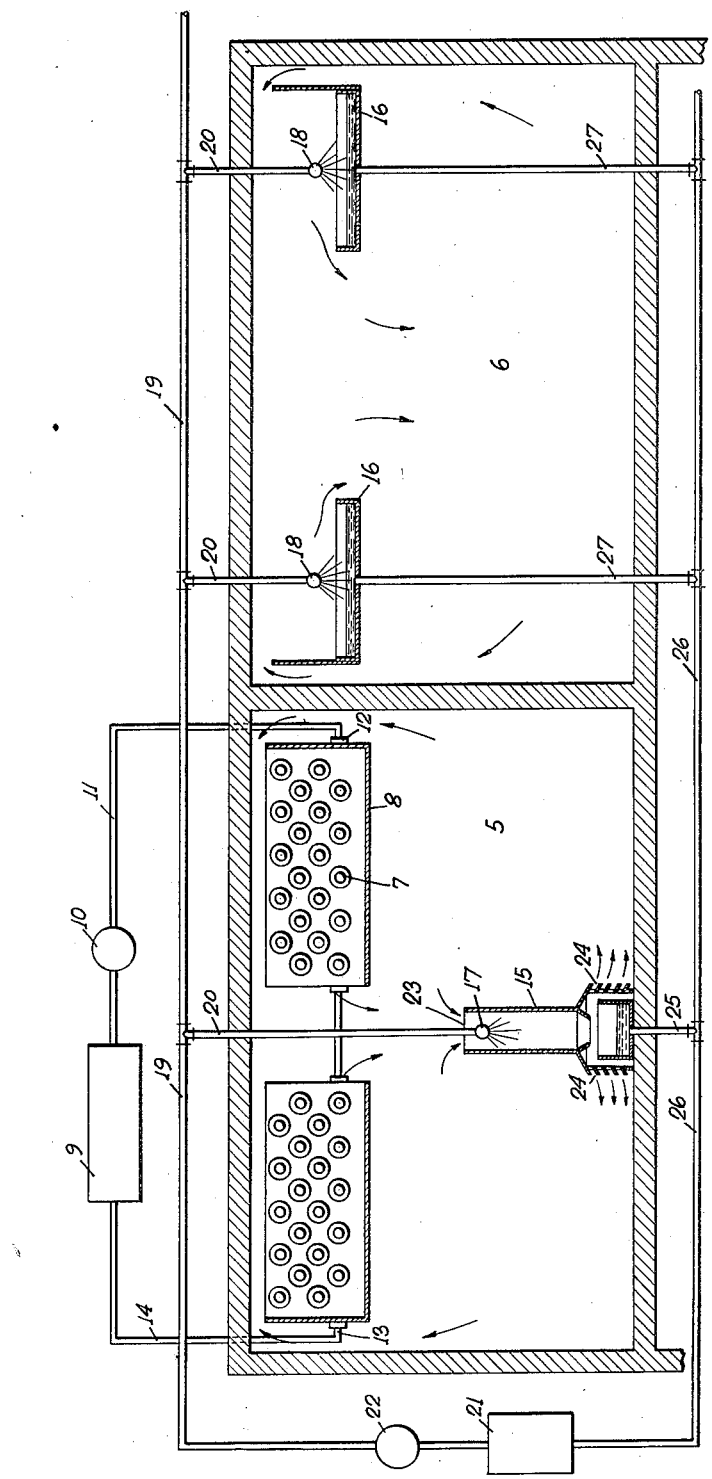
INVENTOR.
WALTER JONES,
BY
ATTORNEY Patented Nov. 3, 1936

2,059,874

UNITED STATES PATENT OFFICE 2,059,874

COLD STORAGE HUMIDIFICATION AND DEHUMIDIFICATION SYSTEM

Walter Jones, Princeton, N. J., assignor to Carrier Engineering Corporation, Newark, N. J., a corporation of New York Application February 14, 1935, Serial No. 6,433

8 Claims. (Cl. 261—9)

This invention relates to the humidification and dehumidification of enclosures, and more particularly, of segregated areas in cold storage or packing plants. In such plants, it is often desirable to maintain a high relative humidity in freezer rooms, so that meat, game, or other comestibles, which are to be refrigerated therein, will not become dehydrated. The heat input into such rooms is largely in the form of sensible heat which tends to raise the temperature of the air in the freezer rooms and so lower the relative humidity. Notwithstanding sound engineering design and careful construction, it is not possible practically to eliminate such heat input, so that the maintenance of high relative humidities presents a serious problem.

Generally, in packing or cold storage plants, brine is available at several temperatures. Also, it is very usual to maintain different temperatures in various rooms or segregated areas of the plant. For example, brine may be available at minus 10 degrees F. to maintain a zero degree temperature in a freezer room, whereas, other brine, say at 20 degrees F. may be utilized to refrigerate a chill room to be maintained at 35 degrees F.

The general object of the invention is to provide a method of and means for air conditioning a plurality of rooms in a cold storage plant, or the like, whereby the temperature and relative humidity of each of the rooms will be desirably controlled despite the fact that brine at one temperature is employed.

Another object of the invention is to provide a method of and means for conditioning the atmospheres of a plurality of cold storage rooms, whereby a first room will be humidified and a second room dehumidified by the use of refrigerant at the same temperature.

Another object of the invention is to provide a method of and means for maintaining a high relative humidity in a cold storage chamber despite increase in sensible heat load in the chamber.

A further object of the invention is to provide a system for humidifying a first chamber and for dehumidifying a second chamber, whereby the total heat load on the refrigerating system serving said chambers will not be increased.

Another object of the invention is to provide for producing and maintaining desired relative humidities in one or more enclosures at an operating cost substantially no greater than that of producing and maintaining therein desired conditions of temperature alone.

A feature of the invention resides in the provision of a spray cabinet in a freezer chamber, means for supplying brine to the sprays in the cabinet at a temperature higher than that of the chamber, whereby the atmosphere of the chamber will have its relative humidity increased.

Another feature of the invention resides in the provision of means for supplying brine at approximately the same temperature in each of a plurality of chambers whereby some of said chambers will be humidified and the atmospheres of others of said chambers cooled and dehumidified.

Another feature of the invention resides in the utilization of a brine solution in a plurality of chambers maintained at different temperatures, whereby the brine will be concentrated in one chamber and diluted in another chamber, the concentration of the brine in the system serving all of said chambers remaining substantially the same.

Other objects and features making for simplicity, efficiency and economy will be more apparent from the following description of one form of the invention to be read in connection with the accompanying drawing which represents a fragmentary elevational view, partly in section, of a plurality of chambers in a cold storage or packing plant.

Referring to the drawing, 5 represents one heat insulated chamber of a storage or packing plant, hereinafter referred to as the "freezing chamber". 6 represents a second heat insulated chamber, hereinafter referred to as the "chill chamber". Cooling coils 7, mounted in decks 8 near the top of chamber 5, may be of the direct-expansion, brine-circulating, or any other desired type. As illustrated, coils 7 are supplied with cold brine from cooler 9 by pump 10 through supply pipe 11 and inlet header 12. Outlet header 13 and pipe 14 return brine to the cooler.

In chamber 5 is positioned spray cabinet 15. In chamber 6 are positioned the spray bunkers 16. Brine is supplied to spray head 17 of cabinet 15 and to spray heads 18 of bunkers 16 by supply pipe 19 and branch pipes 20 which are fed from cooler 21 by pump 22. In operation, chamber 5 is to be kept at a temperature below freezing, say at zero degrees F. To maintain this temperature, brine is supplied to cooling coils 7 at a temperature below zero degrees, say at minus 10 degrees. In order that the air in chamber 5 may be humidified, brine is supplied to spray 17 at a temperature above zero degrees, say at 15 degrees. The action of the spray induces a circulation of air through the inlet 23 and the outlet louvres 24 of cabinet 15. In passing through the cabinet 15, the air comes into ultimate contact with the relatively warmer spray, and there occurs a heat interchange between the air and brine in which the brine is cooled and the air is heated. Part of the water of the spray is evaporated, the air tending to become saturated at the temperature of the leaving brine. Complete saturation, however, is not ordinarily attained. As the air is discharged from louvres 24 and is subjected to the heat load of the enclosure 5, its temperature rises and its relative humidity is reduced. The air so heated rises, as indicated in the drawing, and contacts the cooling coils 7. These coils reduce the temperature of the air and so increase its relative humidity. If the temperature of coils 7 is maintained at a sufficiently low value, the air leaving the decks 8 will be completely saturated at the desired temperature. Thus, notwithstanding the infiltration of warm air into the freezer chamber, heat transfer through the walls of the chamber, and the like, which would tend to raise the temperature of the chamber, and so lower the relative humidity therein, applicant's invention, by providing for the immediate dissipation of such heat gains to the cooling coils, supplies to the enclosure from the cooling coils air which is cold and saturated and which remains substantially unaffected by the sources of heat above mentioned. Conditions of low temperature and high relative humidity are thus assured. That portion of the spray which is not evaporated is returned through pipes 25 and 26 to cooler 21. It will thus be noted that applicant attains complete saturation of the air by first bringing it into intimate contact with a relatively warmer spray in order that it may take up moisture and then, cooling it sufficiently to raise its relative humidity to the saturation point.

Considering now chamber 6, brine, from pipe 19, at, say, 15 degrees, is supplied to the spray headers 18. The temperature of the chill chamber, due to heat load therein, may approximate 35 degrees. As will be understood, the relatively cold sprays will cool the air of chamber 6, and in reducing the temperature thereof, will dehumidify the air. Thus, bunkers 16 will collect not only substantially all of the spray water, but, also, the moisture condensed out of the air in the enclosure. Thus, the brine supplied from spray headers 18 and water condensed out of the air are returned together through pipes 27 to the brine circulatory system.

It will be observed that, whereas the brine returned through pipe 25 is concentrated, by reason of the evaporation in cabinet 15, of water from the solution, the brine returned through pipes 27 is diluted, by reason of the condensation of moisture from the air of chamber 6. Practically, therefore, the concentration of the brine solution in the system, serving both chambers, remains substantially constant.

It will be observed, also, that while heat is added to the air in chamber 5 by the relatively warmer spray, the brine of the spray is correspondingly cooled. In chamber 6, the brine spray will be heated, since the air with which it contacts is relatively warmer. The gain or refrigeration of the brine taking place in chamber 5 offsets the loss or rise in temperature of the brine in chamber 6, so that as a practical matter, no substantial loss of refrigeration takes place in the system as a whole, due to the humidification and dehumidification steps. Thus, applicant's system provides for the maintenance of desired conditions of both low temperature and high relative humidity at a cost no greater than that of maintaining desired conditions of low temperature alone.

While this specification has been concerned with a pair of chambers, one at a temperature below freezing and the other at a temperature above freezing, it will be apparent to those skilled in the art that applicant's method is applicable to any pair of enclosures at different temperatures. Further, although only two chambers are illustrated, it is obvious that any number of chambers might be thus conditioned; and any system in which brine is supplied to a plurality of chambers, to effect humidification of certain of said chambers and dehumidification of certain other of said chambers, and in which the brine returned from the chambers is mixed and conditioned for return to the chambers, is deemed within the purview of this specification.

Since many variations and adaptations of the method and apparatus here described may be made without departing from the spirit and scope of the invention, applicant intends that this specification be considered as illustrative only, and limits himself only as indicated in the appended claims.

I claim:

1. The method of conditioning a plurality of enclosures which comprises intimately contacting a first volume of fluid with a first volume of air at a temperature lower than that of the fluid, intimately contacting a second volume of fluid with a second volume of air at a temperature higher than that of the fluid, whereby the first volume of air will be heated and humidified and whereby the second volume of air will be dehumidified and cooled, then cooling said first volume of air whereby its relative humidity may be increased to the saturation point, mixing the unevaporated portion of said first volume of fluid, said second volume of fluid and the fluid condensed from said second volume of air, refrigerating said fluid and recirculating said fluid through the system.

2. The method of conditioning a plurality of enclosures which comprises supplying fluid to a plurality of enclosures, the temperature of certain of said enclosures being lower than that of said fluid and the temperature of certain other of said enclosures being higher than that of said fluid, whereby the air of said first mentioned enclosures will be humidified and whereby the air of said last-mentioned enclosures will be dehumidified and cooled, cooling the humidified air whereby its relative humidity may be increased to the saturation point, and returning for recirculation through the system the unevaporated portion of fluid supplied to said first mentioned enclosures, the fluid supplied to said last-mentioned enclosures and the fluid condensed from the air thereof.

3. The method of conditioning a plurality of enclosures which comprises contacting a first volume of fluid with a first volume of air whereby part of the fluid will be evaporated and said air will be humidified, contacting a second volume of fluid from the same source and at substantially the same temperature as the first volume of fluid with a second volume of air, whereby fluid will be condensed from the second volume of air, mixing the fluid so condensed with the second volume of fluid and with the unevaporated portion of the first volume of fluid, and returning such mixture to said source of fluid, whereby the volume of fluid in the system may be maintained substantially constant.

4. The method of conditioning a plurality of enclosures, consisting in supplying a fluid to a first enclosure whose temperature is lower than that of the fluid, and to a second enclosure whose temperature is higher than that of the fluid, whereby the first enclosure will be humidified and the second enclosure will be dehumidified, returning from the first enclosure the unevaporated portion of the fluid supplied thereto, returning from the second enclosure the fluid supplied thereto and the water condensed from the air thereof, mixing these returned fluids and said condensed water to form the fluid supplied to the enclosures, refrigerating such mixture, and returning said mixture to said enclosures.

5. The method of conditioning a plurality of enclosures which comprises supplying brine to a first enclosure, evaporating therein part of the water of the brine, supplying other brine having substantially identical characteristics to a second enclosure, whereby the first enclosure will be humidified and the second enclosure dehumidified, returning from the first enclosure brine concentrated by such evaporation and returning from the second enclosure brine diluted by the water condensed from the air in said second enclosure, mixing the concentrated brine and the diluted brine, cooling the brine mixture and returning it to the enclosures.

6. In a refrigerating system, a first volume of air, a second volume of air, a source of fluid, means for refrigerating fluid from said source to a first temperature, means for refrigerating said first volume of air to a second temperature lower than said first temperature, means for intimately contacting refrigerated fluid from said source with said first volume of air and with said second volume of air, the fluid contacting each of said volumes of air being at substantially the same temperature whereby said first volume of air will be humidified and said second volume of air will be dehumidified, and means for returning to said source fluid condensed from said second volume of air.

7. In an air conditioning system, a source of fluid, a first enclosure, a second enclosure, means for refrigerating said first enclosure, means for intimately contacting fluid from said source with the air of said first enclosure and with the air of said second enclosure, whereby said first enclosure will be humidified and said second enclosure will be dehumidified, and means for returning fluid from said enclosures to said source, fluid being supplied to and returned from said enclosures in parallel arrangement.

8. In an air conditioning system, a source of fluid, means for passing fluid from said source in contact with a first volume of air having a temperature lower than that of the fluid, means for passing fluid from said source in contact with a second volume of air having a temperature higher than that of the fluid, and means for returning fluid to said source, fluid being supplied to and returned from contact with said air volumes in parallel arrangement, fluid contacting said first volume of air being at substantially the same temperature as fluid contacting said second volume of air.

WALTER JONES.